United States Patent
Seiders

(10) Patent No.: US 7,967,934 B2
(45) Date of Patent: *Jun. 28, 2011

(54) METHOD OF ATTACHING A LABEL TO A THERMOPLASTIC SUBSTRATE

(75) Inventor: Richard L. Seiders, Verona, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/706,059

(22) Filed: Feb. 16, 2010

(65) Prior Publication Data

US 2010/0143659 A1    Jun. 10, 2010

Related U.S. Application Data

(63) Continuation of application No. 11/470,300, filed on Sep. 6, 2006, now Pat. No. 7,691,218.

(51) Int. Cl.
*B32B 37/04* (2006.01)

(52) U.S. Cl. .................. 156/219; 156/308.2; 156/309.6

(58) Field of Classification Search .................. 156/151, 156/155, 250–252, 261, 308.2, 309.6, 324.4, 156/219
See application file for complete search history.

(56) References Cited

U.S. PATENT DOCUMENTS

| 3,983,645 A | 10/1976 | Rycroft |
| 5,157,812 A | 10/1992 | Musil |
| 5,232,528 A | 8/1993 | Reznickenko et al. |
| 5,291,644 A | 3/1994 | Musil |
| 5,390,407 A | 2/1995 | Musil |
| 6,277,228 B1 | 8/2001 | Fabrikant et al. |
| 6,908,113 B2 | 6/2005 | Chaduc et al. |
| 2001/0030021 A1 | 10/2001 | Romig et al. |
| 2005/0029331 A1* | 2/2005 | Kano et al. ................. 228/112.1 |
| 2009/0117387 A1 | 5/2009 | Scadden et al. |

FOREIGN PATENT DOCUMENTS

| DE | 2752202 | * | 6/1979 |
| DE | 3543105 A1 | | 6/1987 |
| EP | 0212656 A1 | | 3/1987 |
| JP | 2003-305576 | | 10/2003 |
| WO | 83/01051 A1 | | 3/1983 |

* cited by examiner

*Primary Examiner* — Kat Wyrozebski
*Assistant Examiner* — Scott W Dodds
(74) *Attorney, Agent, or Firm* — Whyte Hirschboeck Dudek SC

(57) ABSTRACT

A label with top, bottom and edge surfaces is attached to a thermoplastic substrate by a method comprising the steps of:
  A. Placing the bottom surface of the label in contact with a surface of the substrate;
  B. Melting a portion of the substrate beneath the label or adjacent to an edge of the label;
  C. Drawing a portion of the melted substrate over an edge of and onto the top surface of the label such that the portion of the melted substrate on the top surface of the label is continuous with the substrate; and
  D. Solidifying the melted substrate.

The attachment does not require adhesive or mechanical fasteners, and the label and thermoplastic substrate can be made of any material that will withstand the conditions of the environment to which they will be exposed.

3 Claims, 7 Drawing Sheets

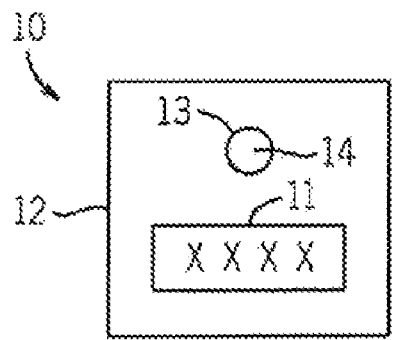
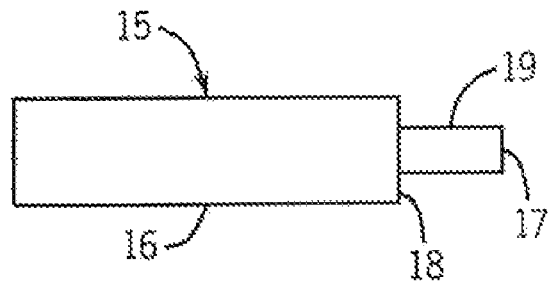
FIG. 1  FIG. 2
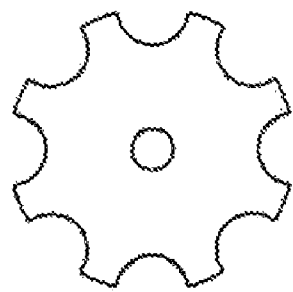 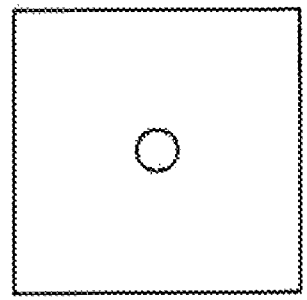
FIG. 3A  FIG. 3B
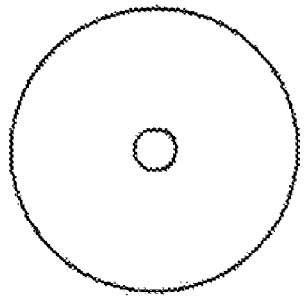
FIG. 3C

METHOD OF ATTACHING A LABEL TO A THERMOPLASTIC SUBSTRATE

CROSS REFERENCE TO RELATED APPLICATION

This application is a continuation application of U.S. patent application Ser. No. 11/470,300 filed on Sep. 6, 2006, now U.S. Pat. No. 7,691,218, the entire content of which is incorporated by reference herein.

FIELD OF THE INVENTION

This invention relates to labels. In one aspect, the invention relates to a method of attaching a label to a substrate while in another aspect, the invention relates to attaching a label to a thermoplastic substrate. In still another aspect, the method relates to attaching a label to a thermoplastic substrate without the use of adhesives while in yet another aspect, the invention relates to thermoplastic substrates bearing labels attached without the use of adhesives or mechanical fasteners.

BACKGROUND OF THE INVENTION

In the field of identification, labeling is commonly employed. One common form of label consists of a (i) middle or substrate layer, e.g., film, foil, nonwoven such as Tyvek® spun-bonded polyolefin), synthetic paper such as Valeron®, or paper, (ii) top or indicia layer providing the identification, e.g., ink, pigment, etc., and (iii) bottom or adhesive layer for attaching the label to the surface of an object. Many types of adhesives are available for use on a label, e.g., pressure-sensitive adhesives (PSAs), hot melt adhesives and the like, but PSAs are widely used because they allow fast and convenient attachment of the label to an object.

As convenient as PSA-bearing labels are, they are not without their limitations. One significant limitation is their use in harsh environments. Under conditions of high heat (or extreme cold), elevated or reduced pressure and/or exposure to various solvents, particularly over extended periods of time, the PSA can lose its ability to bind the label to the object.

One such case is in the field of providing identification for tissue cassettes. These devices are typically made of a thermoplastic material, and they are designed to hold biological tissue specimens while the specimen is subjected to dehydration followed by encapsulation in wax. The dehydration process requires exposure to a range of solvents such as formalin, ethanol and xylene. This is followed by embedding the dehydrated specimen in hot wax (e.g., molten paraffin). These processes can last for hours and can include exposure to heat and vacuum. Notwithstanding the wide range of PSAs available, e.g., acrylates, tackified natural and synthetic rubbers, silicones and urethanes, none have shown resistance to the complete range of conditions to which a tissue cassette is typically exposed. As such, PSAs are generally unsuitable for reliable attachment of identification labels to tissue cassettes and, for that matter, to many industrial process containers that are also exposed to harsh environmental conditions, such as those used in the food and dairy industries, or those used for storage of hazardous materials, or those used in subzero storage (where many PSAs lose their adhesive properties). Moreover, PSAs can provide inadequate adhesion in those situations where the substrate is not exposed to harsh environmental conditions, but where the surface of the substrate is too rough or textured to allow for good adhesion between it and the label.

SUMMARY OF THE INVENTION

This invention provides a reliable method of attaching a label to a thermoplastic substrate in such a manner that the label will not detach from the substrate in a harsh environment. The attachment does not require adhesive or mechanical fasteners, and the label and thermoplastic substrate can be made of any material that will withstand the conditions of the environment to which they will be exposed.

In one embodiment, the invention is a method of attaching a label with top, bottom and edge surfaces to a thermoplastic substrate, the method comprising the steps of:
  A. Placing the bottom surface of the label in contact with a surface of the substrate;
  B. Melting a portion of the substrate beneath the label or adjacent to an edge of the label;
  C. Drawing a portion of the melted substrate over an edge of and onto the top surface of the label such that the portion of the melted substrate on the top surface of the label is continuous with the substrate; and
  D. Solidifying the melted substrate.

The edges of the label over which the molten substrate is drawn can be external or internal to the label. The external edges of the label are, of course, those that define the three dimensional size and configuration of the label, while the internal edges of the label, if any, are those that define a hole or holes of any size and configuration within the external edges of the label.

In another embodiment, the invention is a method of attaching a label with top and bottom surfaces to a thermoplastic substrate, the method comprising the steps of:
  A. Placing the bottom surface of the label in contact with a surface of the substrate;
  B. Forming a hole through the label;
  C. Melting a portion of the substrate beneath the hole in the label;
  D. Drawing a portion of the melted substrate through the hole and onto the top surface of the label such that the portion of the melted substrate on the top surface of the label is continuous with the substrate; and
  E. Solidifying the melted substrate.

In another embodiment, the invention is a method of attaching a meltable label with top and bottom surfaces to a thermoplastic substrate, the method comprising the steps of:
  A. Placing the bottom surface of the label in contact with a surface of the substrate;
  B. Forming a hole through the label with a probe comprising a body and heated tip, the tip (i) heated to a temperature sufficient to melt that portion of the label with which it makes contact, (ii) having lateral sides and a cross-sectional area, and (iii) joined to the body to form a shoulder, the hole formed in the label having a periphery defining a cross-sectional area larger than the cross-sectional area of the tip and creating a space between the lateral sides of the tip and the periphery of the hole;
  C. Advancing the heated tip through the hole in the label into the substrate such that the substrate in contact with the tip melts and is displaced by the advancing tip through the space defined by the periphery of the hole and the lateral sides of the tip, the melted substrate moving through the space until making contact with the shoulder of the probe at which point the melted substrate spreads beyond the periphery of the hole and onto the top surface of the label;
  D. Withdrawing the tip of the probe from the substrate and hole in the label; and E. Solidifying the melted substrate such that the solidified substrate on top of the label is continuous with the substrate beneath the label.

In one variation on this method, the tip of the probe makes a hole in the label of approximately the same size as the cross-sectional area of the tip, and then the tip is moved laterally or rotationally about the hole to enlarge it to a cross-sectional area greater than that of the tip but less than the cross-sectional area of the shoulder, before the tip is advanced into the substrate. In another variation on this method, the probe comprises a retractable tip nested within a sleeve, and the shoulder is optional. Both the tip and sleeve are heated and when both are brought in contact with the label, they form a hole in the label approximately the size of the cross-sectional area of the sleeve. Once the hole in the label is formed, then the tip is advanced into the substrate, and the melted substrate is displaced up and onto the label surface through the area between the advanced tip and the edge of the hole.

"Substrate on top of the label is continuous with the substrate" and similar terms mean that the substrate in either a melted or solidified state is unitary and unbroken. Upon solidification of the melted substrate, the label is embedded, wholly or partly, in the substrate and as such, the label is affixed to and incorporated into the substrate. "Drawn", "displaced" and similar terms mean that the melted substrate is moved by any force or action from the unmelted substrate through a hole in or over an edge of a label onto the top surface of the label.

In still other embodiments, the invention is a label-bearing, thermoplastic substrate, the label affixed to the substrate by melted and re-solidified substrate, particularly such label-bearing substrates as those made by one of the methods described above.

BRIEF DESCRIPTION OF THE DRAWINGS

FIG. 1 is a top plane view of a label with a pre-formed hole.

FIG. 2 is a side perspective of a tool (aka, a probe) useful for joining a label to a surface of a thermoplastic substrate.

FIGS. 3A-3C are bottom perspectives of various shapes of the tool of FIG. 2.

DESCRIPTION OF THE PREFERRED EMBODIMENTS

Figure 4A:
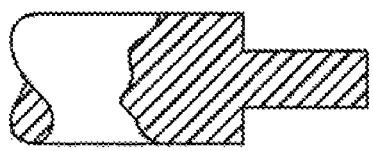
FIGS. 4A-4B are side perspectives of two shoulder shapes of the tool of FIG. 2.
Figure 4B:
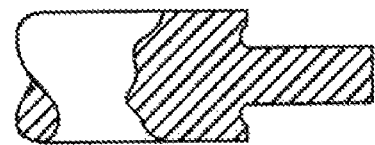

Any label that can withstand the conditions of the environment in which it will be used can be used in the practice of this invention. The labels can be of any size and shape, and they may contain pre-formed holes for use in attachment to the substrate, particularly if the label is made from a material with a melting point substantially different from the thermoplastic substrate to which the label will be attached. If such holes are present, the holes can be of any convenient size, shape and placement, and can be formed in any convenient manner, e.g., punching, molding, etc. FIG. 1 illustrates a label with a pre-formed hole. In this particular embodiment, label 10 has a generally rectangular shape and it bears information 11. Label 10 comprises continuous external edge 12 which defines the size and generally rectangular shape of label 10, and continuous internal edge 13 which defines the size and generally circular shape of hole 14.

Materials from which the substrate layer of the label can be constructed include, but are not limited to, plastic, paper, metal, ceramic, cloth, wood, composites and combinations of two or more of these materials. The construction of the label can take essentially any form including, but not limited to, single and multi-layer plastic films, foil, paper-foil laminates, plastic-paper laminates, plastic-foil laminates, solid plastic or metal tags, plastic-encapsulated paper or foil, and the like. The labels are typically sized to the substrate to which they will be attached; they can be flexible or rigid; and they are typically thin and light-weight. The labels typically have an indicia-layer bearing information, or at least a layer capable of receiving and bearing information once applied to an object (although the substrate layer may provide this function directly), and can include an adhesive layer although in the context of this invention, an adhesive is unnecessary.

In one embodiment of this invention, the labels comprise a plastic film bearing indicia on one face surface, e.g., the top surface, and an adhesive on the other face surface, e.g., the bottom surface. Typical film is available in strip form and as such, it has six surfaces, two face surfaces and four edge surfaces. If in the shape of a disc or other curved geometric shape, then the film has two face surfaces and one continuous edge surface. Regardless of the configuration, these edge surfaces are the external edges that define the three-dimensional size and configuration of the film or label. In the context of this invention, the film (or any other label for that matter), can be of any configuration or size. The indicia can be applied in any conventional manner using materials designed for the environment in which the label will be used, e.g., ink, paint, metal and the like. While not a layer of the film, the ink, or other media displaying the information, is a separate layer of the label.

The adhesive is preferably a PSA of any chemical composition sufficient to attach at least temporarily the label to a surface of a thermoplastic substrate under ambient conditions, e.g., 23 C and atmospheric pressure. Like the ink, the adhesive is not a layer of the film, but it is a layer of the label. The adhesive can be applied in any conventional manner and in any conventional amount, and it can be covered with a release liner of any conventional construction to protect it until the label is ready to be applied to the substrate.

The film itself can be single or multi-layered and if multi-layered, then of any number of layers. The film can comprise any composition, but preferably is constructed from one or more thermoplastic materials, e.g., polyolefin, polyester, polyurethane, polyether, nylon or the like. The choice of thermoplastic will be decided, in large part, by the conditions, e.g., temperature, pressure, solvents, abrasion, etc., to which the label will be exposed. Preferably, the thermoplastic is one that melts and re-solidifies with little, if any, change to its properties.

The substrate or object to which the label is attached can be made from any material or combination of materials, but the surface of the substrate or object to which the label is attached is made from a thermoplastic material. In certain embodiments, e.g., tissue cassettes, the entire or nearly the entire object is made from a thermoplastic material. In other embodiments, the majority of the object is made from a non-thermoplastic material, e.g., metal, wood, thermoset plastic, ceramic, etc., but at least that part of the object adapted to receive a label comprises a thermoplastic material.

Any thermoplastic material can form the surface of the object adapted to receive the label, but preferably the material is one that melts and re-solidifies with little, if any, change in properties. These thermoplastic materials include without limitation polyolefins (e.g., polyethylene, polypropylene, etc.), polystyrene, polyacetals, polyesters, polyurethanes, and the like.

In one embodiment, the method of attaching the label to the substrate comprises the steps of (i) contacting the bottom face surface of the label with a face surface of the substrate, (ii) melting a portion of the substrate beneath or near an internal or external edge of the label, (iii) drawing or otherwise moving a portion of the melted substrate over an edge onto the top surface of the label such that the melted substrate on the top face of the label is continuous with the substrate, and (iv) solidifying the melted substrate. The bottom surface of the label preferably contains a PSA to hold the label in place on the substrate while a portion of the substrate is melted and drawn onto the top surface of the label. The substrate can be melted in any conventional manner using any conventional means, e.g., a tool or gas heated to a temperature above which the thermoplastic substrate will melt and flow, but not burn or otherwise deteriorate, and typically only that portion of the substrate is melted to provide enough melt to flow onto the top surface of the label to affix it in place on the substrate after the melt solidifies. The melted substrate can be drawn onto the top surface of the label by any means such as through the use of a displacement tool, elevated or reduced pressure, surface tension and the like.

Depending upon the nature of the label and substrate, the top surface of the label can be completely covered with the melted and then solidified substrate (assuming that the solidified substrate is sufficiently transparent or translucent to allow the information on the top surface of the label to be read by a person or machine, as the case may be) or more typically, only sufficient melted substrate is drawn or otherwise moved onto only that part of the top surface of the label, and then solidified, to hold the label in place for the intended purpose and time. In this embodiment, the label preferably comprises holes so that it need not be pierced, cut, penetrated, crimped, dented, folded, fluted or otherwise modified or shaped once in contact with the substrate to assist the affixation of it to the substrate upon solidification of the melted substrate although it can be if desired. The hole or holes in the label are sized such that if a displacement tool, e.g., a heated probe tip, is used to move molten substrate through the hole onto the top surface of the label, the hole is larger than the tool, e.g., larger than the tip of the probe. Preferably, in this embodiment the label is constructed of material with a sufficiently high melting point that it will not melt or otherwise deteriorate during the melting, drawing and solidification of the substrate.

In another embodiment, the method of attaching the label to the substrate comprises the steps of (i) placing the bottom surface of the label in contact with a surface of the substrate, (ii) forming a hole through the label, (iii) melting a portion of the substrate beneath the hole in the label, (iv) drawing or otherwise moving a portion of the melted substrate through the hole and onto the top surface of the label such that the portion of the melted substrate on the top surface of the label is continuous with the substrate, and (v) solidifying the melted substrate. In this embodiment, the label is modified as part of the method to create a hole in it such that melted or molten substrate can be drawn or otherwise drawn through the hole and onto the top surface of the label. The size and shape of the hole is typically a function of the tool used to make the hole, and this size and shape can vary to convenience. Typically, the size and shape of the hole is no more than that needed to strongly attach the label to the substrate. In a preferred embodiment, enough melted substrate is drawn or displaced onto the top surface of the label and about the periphery of the hole to form a small ridge or berm about the hole upon solidification of the melted substrate.

In another embodiment, the method of attaching the label to the substrate comprises the steps of:

A. Placing the bottom surface of the label in contact with a surface of the substrate;
B. Forming a hole through the label with a probe comprising a body and heated tip, the tip (i) heated to a temperature sufficient to melt that portion of the label with which it makes contact, (ii) having lateral sides and a cross-sectional area, and (iii) joined to the body to form a shoulder, the hole formed in the label having a periphery defining a cross-sectional area larger than the cross-sectional area of the tip and creating a space between the lateral sides of the tip and the periphery of the hole;
C. Advancing the heated tip through the hole in the label into the substrate such that the substrate in contact with the tip melts and is displaced by the advancing tip through the space defined by the periphery of the hole and the lateral sides of the tip, the melted substrate moving through the space until making contact with the shoulder of the probe at which point the melted substrate spreads beyond the periphery of the hole and onto the top surface of the label;
D. Withdrawing the tip of the probe from the substrate and hole in the label; and
E. Solidifying the melted substrate such that the solidified substrate on top of the label is continuous with the substrate beneath the label.

Figure 5A:
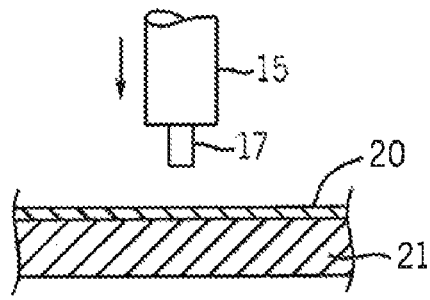
FIGS. 5A-5F are side perspectives of the tool of FIG. 2 in a sequence of steps in which a label is attached to a thermoplastic substrate.
Figure 5B:
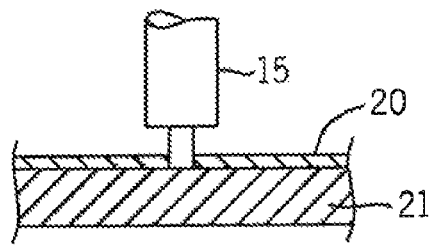
Figure 5C:
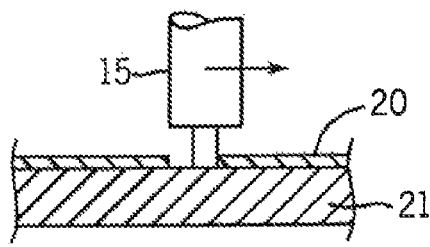
Figure 5D:
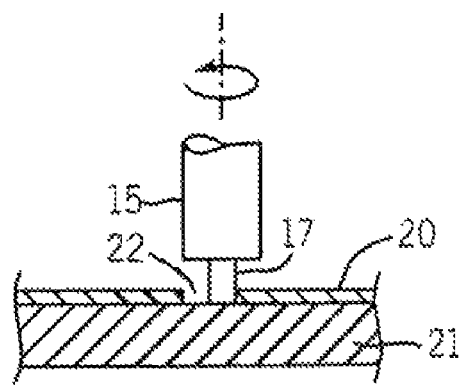
Figure 5E:
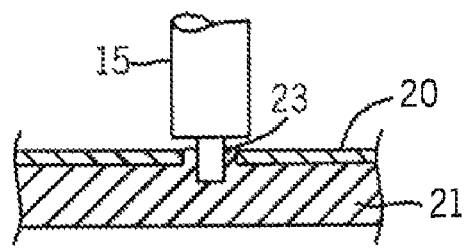
Figure 5F:
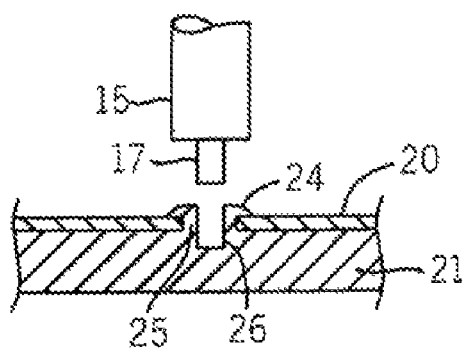

This embodiment is particularly well adapted to attaching a label to a tissue cassette that is made from a thermoplastic material such as polyacetal (also known as polyoxymethylene or acetal resin). The attaching structure, i.e., the re-solidified substrate, typically has an eyelet-like shape comprising a rim or head and a wall, the wall defining a central hole (FIG. 5F). This structure is formed by advancing a heated probe to just penetrate the label, manipulating the probe in a manner to enlarge the hole to a diameter or cross-section greater than the diameter or cross-section of the probe, and then advancing the probe into the substrate such that the substrate is melted and the melted substrate moves through the hole and onto the top surface of the label. The melted substrate is continuous with the unmelted substrate such that when the melted substrate solidifies, the re-solidified melt on the top of the label is one with the unmelted substrate beneath the label holding fast the label to the surface of the substrate.

In a variation on this embodiment, the probe comprises a retractable, heated tip nested within a heated sleeve, both tip and sleeve are brought in contact with the label to melt or otherwise form a hole in the label of approximately the same cross-sectional area as that of the sleeve, and then the tip is advanced through the hole into the substrate to melt the substrate and displace the melted substrate through the area between the edge of the hole and the tip onto the top surface of the label. In this variation, the tip and sleeve can be of any cross-sectional configuration, and typically both are circular. Moreover, the sleeve can replace the body in this variation and thus eliminate the shoulder, or in an alternative design, the sleeve can join with the body to form the shoulder in essentially the same manner that the tip and body formed a shoulder as earlier described.

The label is preferably made from a material that either melts or otherwise is deformed to form a hole to allow the probe to advance into and melt the substrate. In one embodiment, the label and substrate are made from the same or similar thermoplastic, e.g., both are made from polyester, while in another embodiment the label and substrate are made from dissimilar thermoplastics, e.g., the label from polyester and the substrate from polyacetal. The label and substrate can have similar or different melting points, and preferably the melting points are relatively close to one another, e.g., within 40 C, more preferably within 30 C, of one another.

Referring to FIG. 2, an exemplary probe is illustrated. Probe 15 comprises body 16 and tip 17, the tip joined to the body to form shoulder 18. The tip comprises lateral wall 19 which is a single wall if curved, e.g., circular, or multiple walls (or a multi-faceted single wall) if polygonal, e.g., square. The probe can be mounted to a mechanical arm or other like device (not shown) for manipulation. The tip is heated by any suitable means, e.g., electrical resistance, to a temperature above the melting temperature of both the label and substrate but below the temperature at which the substrate burns, vaporizes or is otherwise destroyed. The probe is made of a material, e.g., stainless steel or ceramic, that has sufficient mechanical strength to withstand repeated and rapid use, and the elevated temperature at which it must operate. The probe may carry a coating to reduce friction and sticking, and to reduce or eliminate spinning of fine threads from the substrate during tool retraction from the melted substrate and label hole.

Probe 15 can have any shape, and FIGS. 3A-3C illustrate several such shapes. FIG. 3A illustrates a fluted shape, and this configuration, if rotated after penetrating the substrate will create many ribbons of melted substrate that can flow through the hole in the label. FIG. 3B illustrates a probe square in cross-section, and this configuration will also result in many ribbons of melted substrate upon removal from the hole. This is true for other polygonal shapes, e.g., pentagon, hexagon, etc. FIG. 3C illustrates a probe round in cross-section, and this is a preferred configuration because it forms attaching structures with holes, walls (i.e., bodies) and heads of consistent shape and size. The probe joins the body in any conventional manner, e.g., welding, mechanical fastening, etc., or it can be designed simply as an integral part of the body. The shoulder shape can also vary as exemplified in FIGS. 4A (flat) and 4B (recessed).

The operation of the probe to form the attaching structure typically follows the sequence of steps illustrated in FIGS. 5A-5F. Probe 15 with tip 17 heated to a temperature in excess of the melting temperatures of label 20 and substrate 21 is positioned above the label (FIG. 5A) at any suitable spot, typically over an area of the label that is not carrying or is not designed to carry information. The size of the tip can vary, and typically it is small relative to the size of the label. By way of illustration, for a label that has a surface area of about 150 square millimeters ($mm^2$) (i.e., the area of one face surface of the label) and is about 0.075 mm thick, the size of the tip is typically less than about 2, preferably less than about 1.5 and more preferably less than about 1, millimeter (mm) in diameter or other cross-section.

The probe is then advanced to penetrate just the label (FIG. 5B) such that the penetrated area of the label is melted or otherwise deformed to form a hole that is the size and shape of the heated tip. The probe tip is then moved in a lateral direction relative to the center of the hole (FIG. 5C) followed by a rotational movement about the center of the hole (FIG. 5D) to create hole 22 which is larger in diameter or cross-section than the diameter or cross-section of tip 17. This pattern of movement works particularly well with a tip round in cross-section. The length of the lateral movement can vary to convenience, but it is typically no more than necessary to enlarge the size of the hole to that of the cross-sectional area of the shoulder, preferably a size between the cross-sectional area of the tip and that of the shoulder. The probe is then returned to the center of the hole. For a tip with a diameter of about 1 mm, the initial hole will also have a diameter of about 1 mm, and this is enlarged to about the diameter of the shoulder, e.g., about 2 mm, through the lateral and rotational movement of the tip. Depending upon the size and composition of the label, the composition of the substrate, the environmental conditions to which the label and substrate will be exposed, and other factors, the label can be affixed to the substrate at more than one attachment point, i.e., the spot or location on the label at which melted substrate is drawn from the substrate through the hole onto the surface of the label surrounding the hole and then allowed to solidify such that the label is affixed to the substrate. If more than one attachment point is created, then each attachment point can be the same or different in size and design as the other attachments point or points of the label to the substrate, and the attachment points can be random or patterned on the label.

Tip 17 is then advanced into the substrate (FIG. 5E) to melt the substrate below the hole such that the advance of the tip displaces melted substrate 23 from the substrate, through the annulus created by the outer wall of the tip and the edge of the hole, up to the shoulder at which point it is turned back onto the top surface of the label. Typically ridge or rim 24 will form to the size of the space between the top surface of the label and the shoulder of the probe forming an eyelet-like structure when it is viewed from above the label. The probe is then retracted, typically to a height just above the top of rim 24 of the extruded molten substrate (FIG. 5F), melted substrate quickly solidifies into an attaching structure that affixes the label to the substrate, and the substrate is removed from beneath the probe or the probe is removed from above the label. The attaching structure comprises rim (aka head) 24 and wall 25 (which defines central hole 26), and the structure is continuous with substrate 21.

Figure 6A:
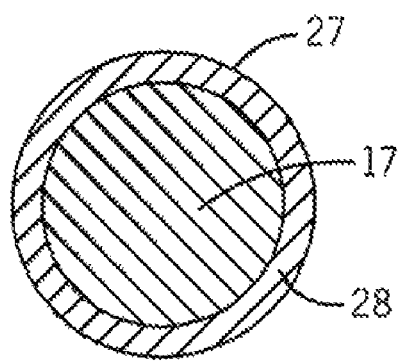
FIGS. 6A-6D are bottom and side perspectives of two other tools useful for joining a label to a surface of a thermoplastic substrate.
Figure 6B:
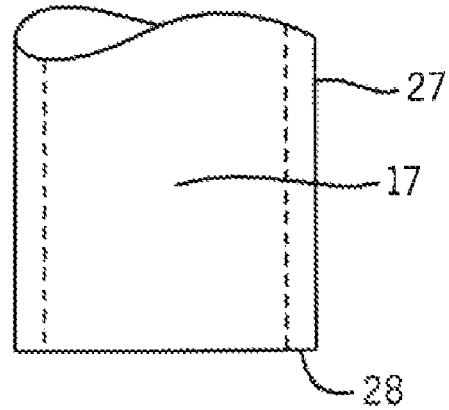
Figure 6C:
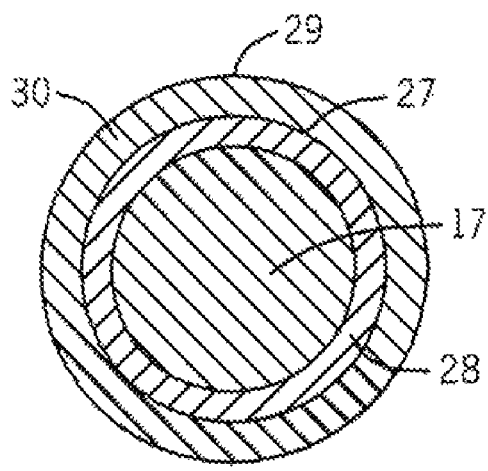
Figure 6D:
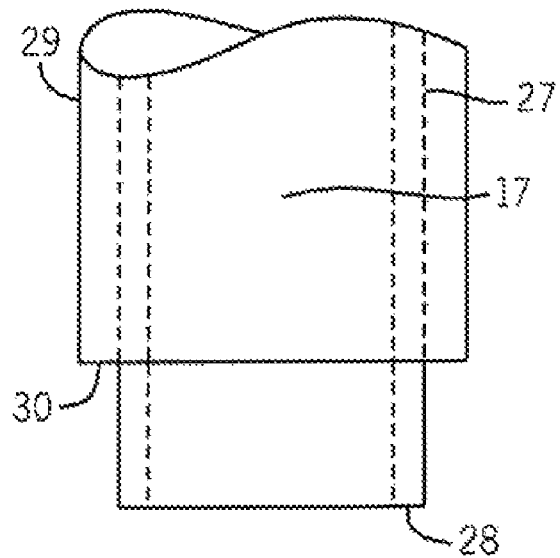

In another method a label is attached to a thermoplastic substrate using one of two alternative probe designs, i.e., the probe design of FIGS. 6A and 6B, or the probe design of FIGS. 6C and 6D. FIG. 6A is a bottom, cross-sectional view and FIG. 6B is a side view of a probe comprising heated tip 17 shown in phantom outline as retracted and nested within heated first sleeve 27 and flush with first sleeve bottom edge 28. FIGS. 6C and 6D show similar views of the same probe, but with the probe further comprising second sleeve or body 29 and second sleeve 29 joining with first sleeve 27 to form shoulder or second sleeve bottom 30. The tip and sleeve can be of any configuration, circular for both is preferred, and can be heated by any convenient means (not shown). The tip is design to extend from and retract into the sleeve with little, if any, friction by any motive power (not shown), and the tip is designed to fit within the sleeve with little, if any, gap between the outer wall of the tip and the inner wall of the sleeve. When within first sleeve 27, the bottom of tip 17 is preferably flush or near flush with bottom edge 28 of first sleeve 27. First sleeve 27 extends slightly beyond second sleeve 29 to form shoulder 30. In an alternative design, tip 17 does not retract, but rather first sleeve 27 retracts into second sleeve 29, preferably such that first sleeve bottom 28 is flush with second sleeve bottom or shoulder 30.

Figure 7A:
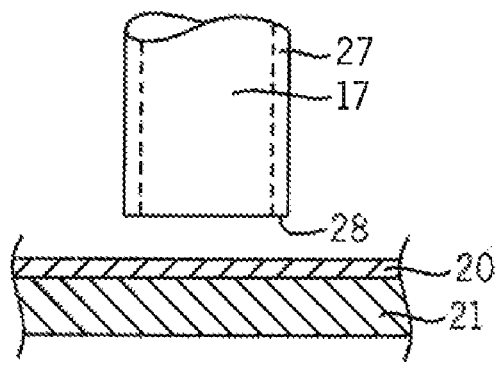
FIGS. 7A-7K are side perspectives of the tools of FIGS. 6A-6D in a sequence of steps in which a label is attached to the surface of a thermoplastic substrate.
Figure 7B:
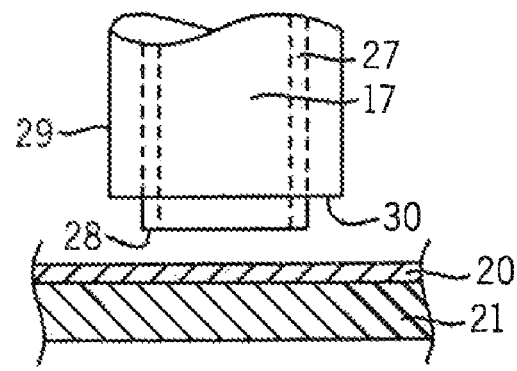
Figure 7C:
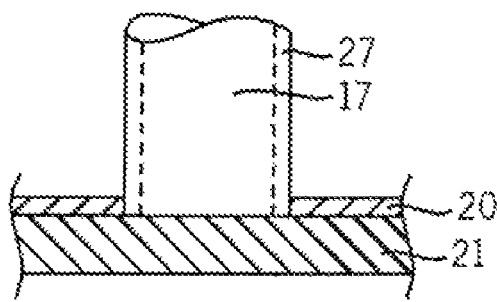
Figure 7D:
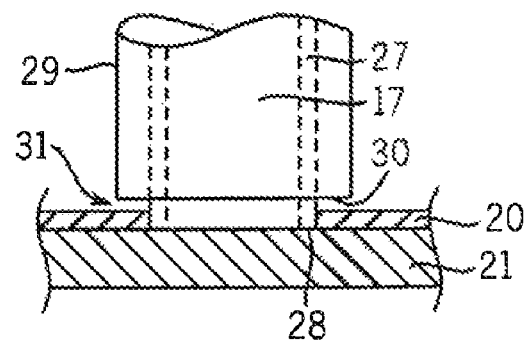
Figure 7E:
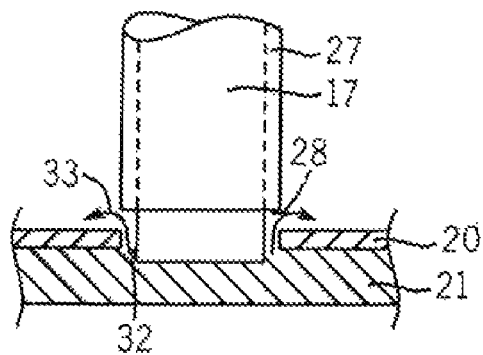
Figure 7F:
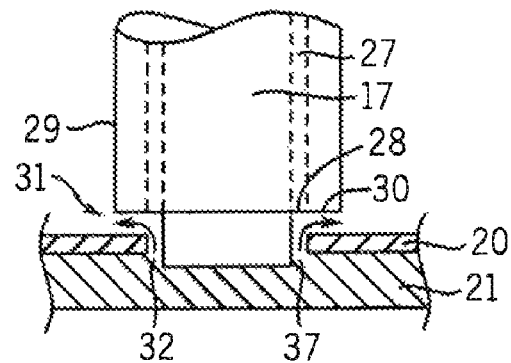
Figure 7G:
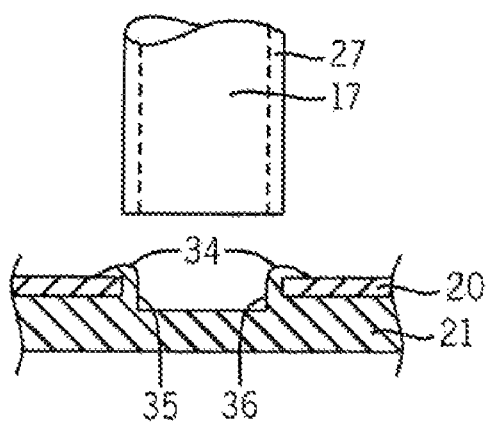
Figure 7H:
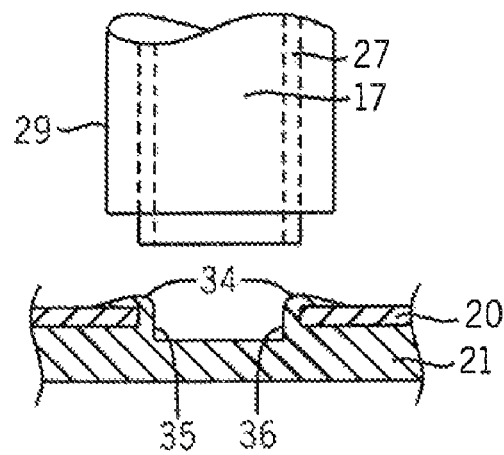
Figure 7I:
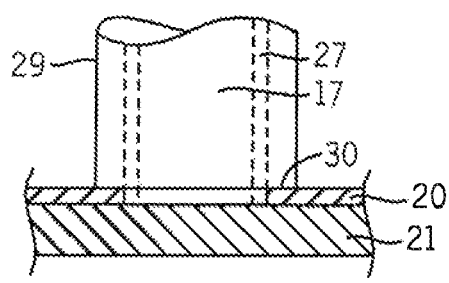
Figure 7J:
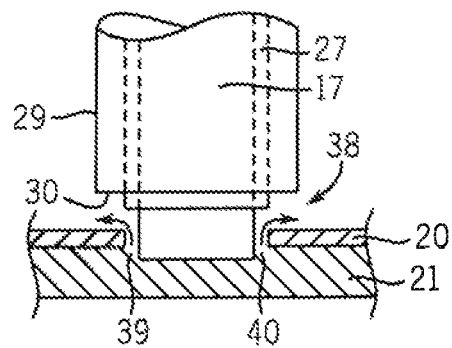
Figure 7K:
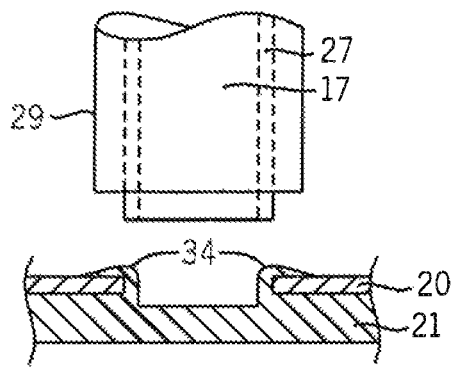

Referring to FIGS. 7A-7K, FIGS. 7A, 7C, 7E and 7G illustrate the operation of the probe described in FIGS. 6A-6B. FIGS. 7B, 7D, 7F and 7H illustrate the operation of the probe described in FIGS. 6C-6D. FIGS. 7I-7K illustrate the operation of a variation on the probe design of FIGS. 6C-6D. In FIGS. 7A-7D, label 20 and substrate 21 are positioned beneath the probe (FIGS. 7A and 7B), and both heated first sleeve 27 and heated tip 17 are brought into contact with label 20 such that the sleeve and tip form a hole in label 20 of approximately the same size in cross-sectional area as the cross-sectional area of first sleeve 27 (FIGS. 7C and 7D). With respect to the double-sleeved probe of FIG. 7D, shoulder 30 is sufficiently distanced from first sleeve bottom 28 that when first sleeve bottom 28 has penetrated to and through the bottom of label 20, gap 31 is formed between the top surface of label 20 and shoulder 30. In a preferred embodiment, when heated first sleeve 27 and heated tip 17 are brought into contact with label 20, the tip is retracted within the first sleeve such that the surface of the tip that contacts the label is flush or near flush with bottom edge 28 of first sleeve 27.

In FIG. 7E, heated first sleeve 27 is removed to a position just above hole 32 which was formed in label 20 by heated first sleeve 27 and heated tip 17, and heated tip 17 is then advanced into substrate 21 such that at least a portion of the substrate is melted and displaced through hole 32 and onto the top surface of label 20 as indicated by arrows 33 to form rim 34 which is continuous with substrate 21 (FIG. 7G). In this embodiment, the melted substrate moves through hole 32 until it contacts bottom edge 28 of sleeve 27, and then it moves out onto the top surface of the label, essentially in the same manner as does the melted substrate when it contacts the shoulder as described in FIGS. 5E and 5F. If the sleeve is not first removed to a position just above the hole, then the melted substrate moves onto the top surface of the label by deforming the label at the edge of the hole to form a gap through which the displaced, melted substrate can ooze. However, in this embodiment the movement of the displaced, melted substrate is not likely to be uniform, and thus it is not likely to form a preferred attaching structure as illustrated in FIG. 7G, i.e., an eyelet-like head 34 with wall 35 defining hole 36.

With continuing reference to FIG. 7G, heated tip 17 is retracted into first sleeve 27, and the melted substrate that forms rim 34 solidifies such that it is continuous with unmelted substrate 21 and label 20 is thus affixed to substrate 21. The re-solidification of the melted substrate can occur before, contemporaneous with, or after the tip is retracted from the hole. First sleeve 27 and tip 17 are then retracted above the height of rim 34, and are readied to repeat the process with another label and substrate. One advantage of this method is that the probe design does not require lateral and/or rotational movement of the tip to create a hole larger in cross-section than the cross-section of the tip.

Referring to FIGS. 7F and 7H, the method is essentially the same as that described for FIGS. 7E and 7G except that it is not necessary to first remove the probe above label 20. Because of the presence of gap 31, heated first sleeve 27 can simply be retracted into second sleeve 29, preferably such that shoulder 30 and first sleeve bottom 28 are flush with one another, and then heated tip 17 can be extended into substrate 21. Melted substrate can then flow through hole 32 as shown by arrows 37. The melted substrate moves through hole 32 until it contacts first sleeve bottom 28 and then flows outward under shoulder 30 onto the top surface of label 20. The melted substrate then forms rim 34, heated tip 17 is withdrawn from hole 36, the probe is removed above the label such that the bottom surface of tip 17 is above rim 34, and tip 17 and first sleeve 27 are returned to their original alignment as illustrated in FIG. 7B ready to repeat the cycle with another label and substrate. Label 20 is affixed to substrate 21 in FIG. 7H in the same manner that label 20 is affixed to substrate 21 in FIG. 7G.

In an alternative and less favored embodiment (FIG. 7I), after the probe is positioned above the label and substrate, the probe is brought into contact with the label such that heated first sleeve bottom 28 and the bottom of heated tip 17 extend to and through the bottom of label 20. The distance between first sleeve bottom 28 and shoulder 30 is essentially the same as the thickness of label 20 such that when first sleeve bottom 28 and the bottom of tip 17 have burned through the bottom of label 20, shoulder 30 is in flush contact with the top surface of label 20. In this embodiment, no gap 31 is formed and as such, after the first sleeve and tip have burned through the bottom of label 20, the probe must be retracted such that gap 31 is formed. Then tip 17 is extended into substrate 21 and melted substrate flows through hole 39 as indicated by arrows 40 to form rim 34 (FIGS. 7J and 7K). Tip 17 is then retracted into first sleeve 27, the probe is lifted to a height above rim 34, and the probe is ready to repeat the cycle.

If automated, the whole process from placing a label on the substrate, to making the hole in the label, to melting the substrate, to forming the attaching structure can be accomplished in a few seconds, if not less than a second, regardless of the tool used. If pre-punched or similar labels are used, i.e., labels in which a hole need not be formed by a probe or similar tool, the process can be further shortened with the understanding that the use of pre-punched labels require alignment of the hole with the tool used to melt and displace the substrate.

The strength of the attaching structure is determined by three factors, i.e., the strength of the material (i.e., the thermoplastic in its solidified state), the thickness of the wall (also known as body or neck) which is essentially the thickness of the annulus formed by the edge of the label hole and the lateral wall of the tip or first sleeve, and the thickness of the rim. If the strength of the material is sufficient for the purposes of the substrate (usually a given), then the strength of the attaching structure is determined by the thickness of the wall and the rim. The wall thickness is controlled by creating a hole in the label that is larger than the probe tip or sleeve which allows adequate molten substrate to flow between the internal diameter of the hole and outer diameter of the probe tip or sleeve. As noted above, the shape of the hole can take many forms and can be created by a number of different methods, but a round hole created as described in FIGS. 5A-5F and 7A-7K are preferred methods.

Although the invention has been described in considerable detail by reference to the drawings, this detail is for the purpose of illustration. Many variations and modifications can be made to the invention by one skilled in the art without departing from the spirit and letter of the appended claims. All U.S. patents, published patent applications and allowed patent applications referenced above are incorporated herein by reference.

What is claimed is:

1. A method of attaching a label with top and bottom surfaces to a thermoplastic substrate, the method comprising the steps of:
   A. Placing the bottom surface of the label in contact with a surface of the substrate;
   B. Forming a hole through the label by contacting the label with a probe comprising a body and heated tip, the tip (1) heated to a temperature sufficient to melt that portion of the label and substrate with which it makes contact, (2) having lateral sides and a cross-sectional area, and (3) joined to the body to form a shoulder with a cross-sectional area;
   C. Enlarging the hole to a size between the cross-sectional area of the tip and the cross-sectional area of the shoulder by first moving the tip in a lateral direction relative to the center of the hole followed by a rotational movement of the tip about the center of the hole;

D. Returning the probe to the center of the hole;

E. Advancing the heated tip through the hole in the label into the substrate such that the substrate in contact with the tip melts and is displaced by the advancing tip through the space defined by the periphery of the hole and the lateral sides of the tip, the melted substrate moving through the space until making contact with the shoulder of the probe at which point the melted substrate spreads beyond the periphery of the hole and onto the top surface of the label;

F. Withdrawing the tip of the probe from the substrate and hole in the label; and G. Solidifying the melted substrate.

2. The method of claim 1 in which the label comprises a thermoplastic film.

3. The method of claim 1 in which the bottom surface of the label that comes in contact with the surface of the substrate carries a pressure-sensitive adhesive.

\* \* \* \* \*